Figure 1:
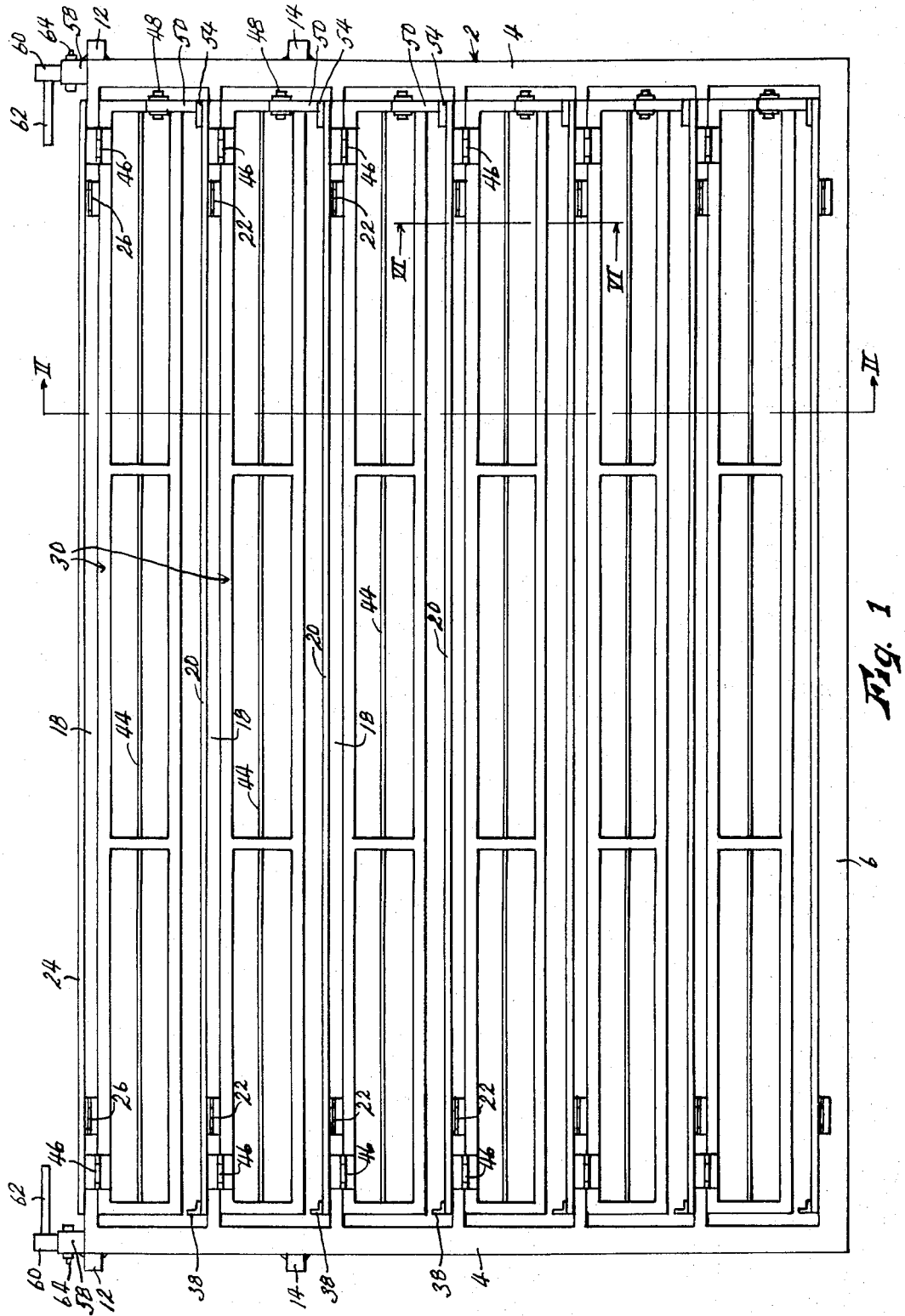

United States Patent [19]
Sanders

[11] 3,774,577
[45] Nov. 27, 1973

[54] POULTRY ENCLOSURE

[76] Inventor: Dickerson H. Sanders, 170 Stanton Way, Athens, Ga.

[22] Filed: July 31, 1972

[21] Appl. No.: 276,653

[52] U.S. Cl. .................................................. 119/17
[51] Int. Cl. ............................................ A01k 31/00
[58] Field of Search ............................... 119/17, 12

[56] References Cited
UNITED STATES PATENTS

| | | | |
|---|---|---|---|
| 3,621,818 | 11/1971 | Johnston et al ....................... | 119/17 |
| 3,695,232 | 10/1972 | Frank .................................... | 119/17 |

*Primary Examiner*—Hugh R. Chamblee
*Attorney*—John A. Hamilton

[57] ABSTRACT

A poultry enclosure for live poultry consisting of an open frame in which are pivoted one or more series of vertically spaced apart trays for poultry, each tray being pivotally movable from a horizontal position to a tilted position in which poultry slides or tumbles from the lower edge thereof, each tray having peripheral side walls to assist in confining poultry thereon, and each higher tray serving as a cover for the next lower tray to complete the confinement, the side wall at the edge of the tray which is lowermost when the tray is tilted being automatically released when the tray is tilted to permit egress of poultry.

16 Claims, 7 Drawing Figures

Patented Nov. 27, 1973

3,774,577

4 Sheets-Sheet 2

Patented Nov. 27, 1973

3,774,577

4 Sheets-Sheet 3

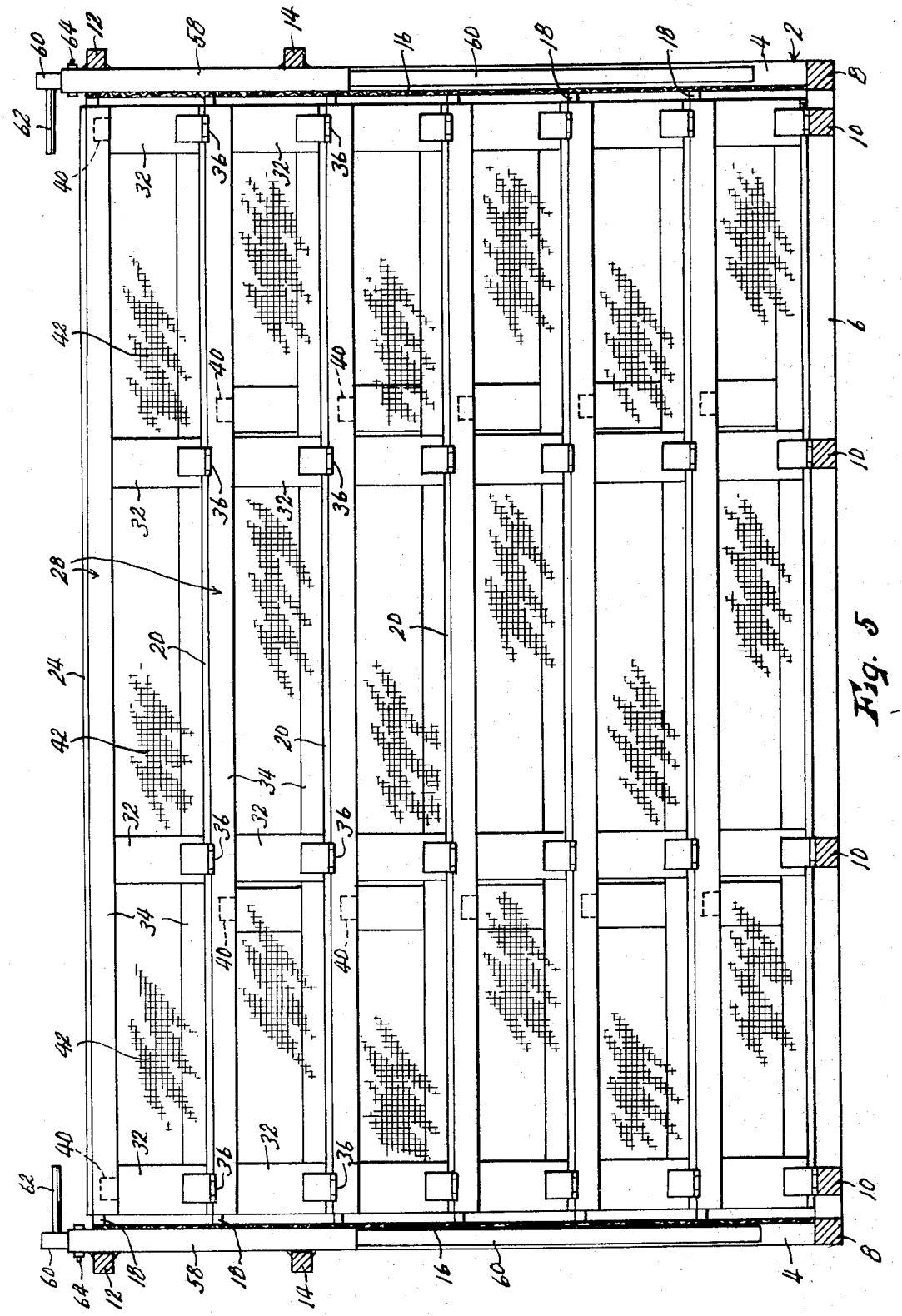

POULTRY ENCLOSURE

This invention relates to new and useful improvements in poultry handling equipment, and has particular reference to an enclosure for live poultry for temporary compact detention and confinement of said poultry whenever desired. For example, the enclosure may be mounted on a truck bed to serve as a means for transporting poultry from a poultry producing form to a poultry processing plant, or as a fixed installation at the processing plant as temporary storage means for the poultry pending readiness of the processing lines of the plant to receive it.

A primary object of the present invention is the provision of a poultry enclosure into which the poultry may be inserted, and from which the poultry may be removed, with no necessity that said poultry need ever be touched or handled by human operators. To this end, the enclosure consists of a number of shelves or trays each adapted to receive live poultry thereon from any suitable conveyor, and from which the poultry may be removed, also to a suitable conveyor, simply by tilting said trays to a sufficient degree that the poultry slides or tumbles therefrom by gravity.

Another object is the provision of a poultry enclosure of the general character described having novel means for releasing poultry from each tray when said tray is tilted. This means includes a side wall at the side of each tray which is lowermost when said tray is tilted, said side wall being movable to an inoperative position not obstructing discharge of poultry from the tray, but having releasable fastening means normally securing it in an operative position. Release of this fastening means occurs automatically whenever the tray is tilted.

A further object is the provision of a poultry enclosure of the character described which makes maximum use of available space for enclosing a maximum quantity of poultry. To this end the trays are arranged in vertical series, spaced apart only as much as required for poultry of the size to be confined, and poultry is discharged by tilting the trays sequentially from the top of the series downwardly. Each tray thus supports the next higher tray of the series, and serves as a cover for the next lower tray of the series.

Other objects are simplicity and economy of construction, efficiency and dependability of operation, and adaptability for enclosing and confining small animals other than poultry.

Figure 2:
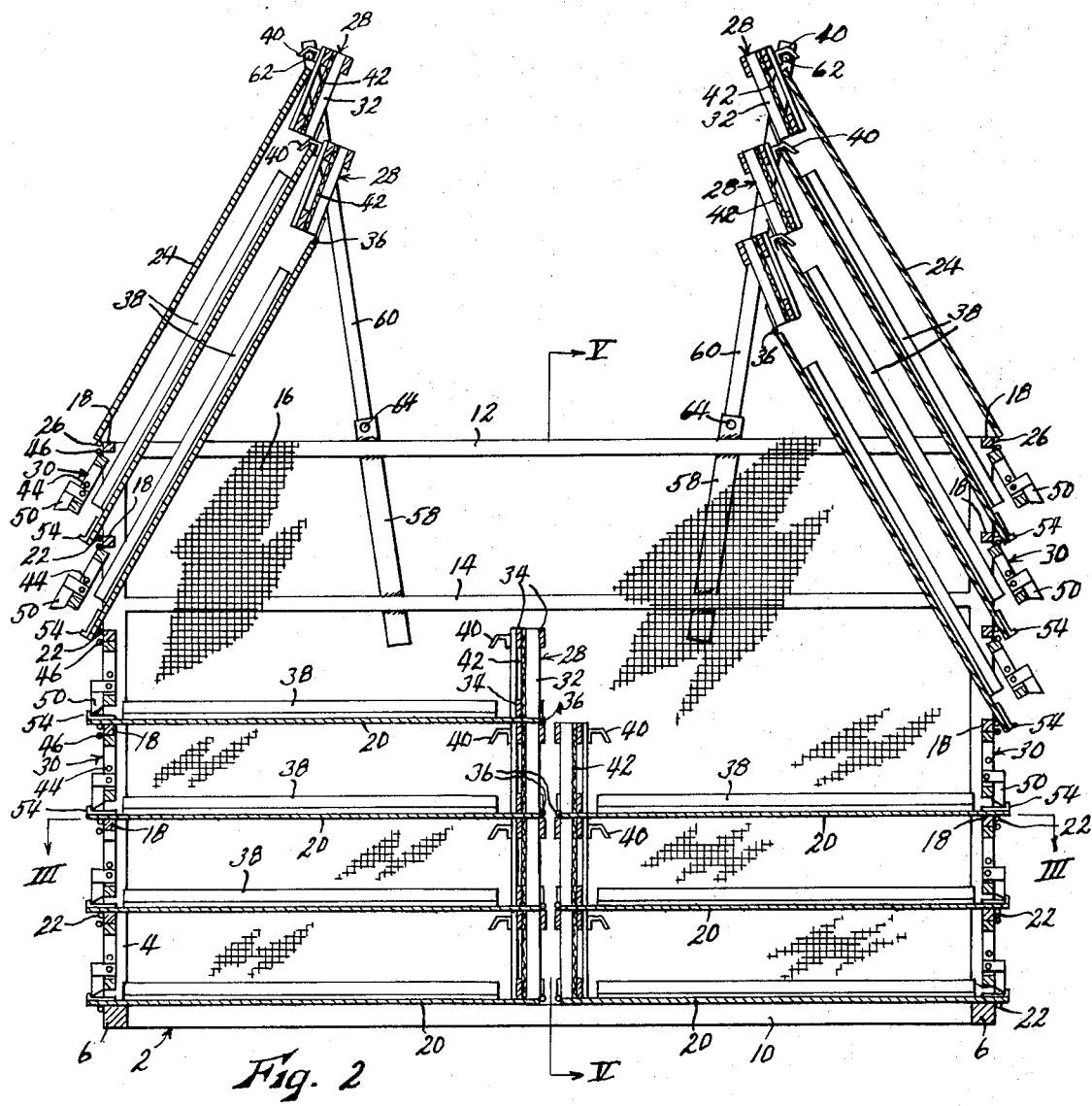
Figure 4:
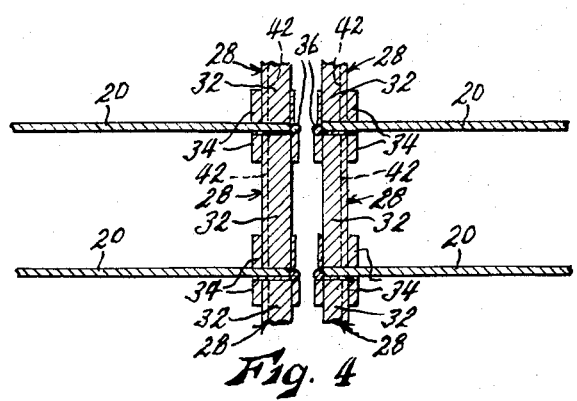
Figure 3:
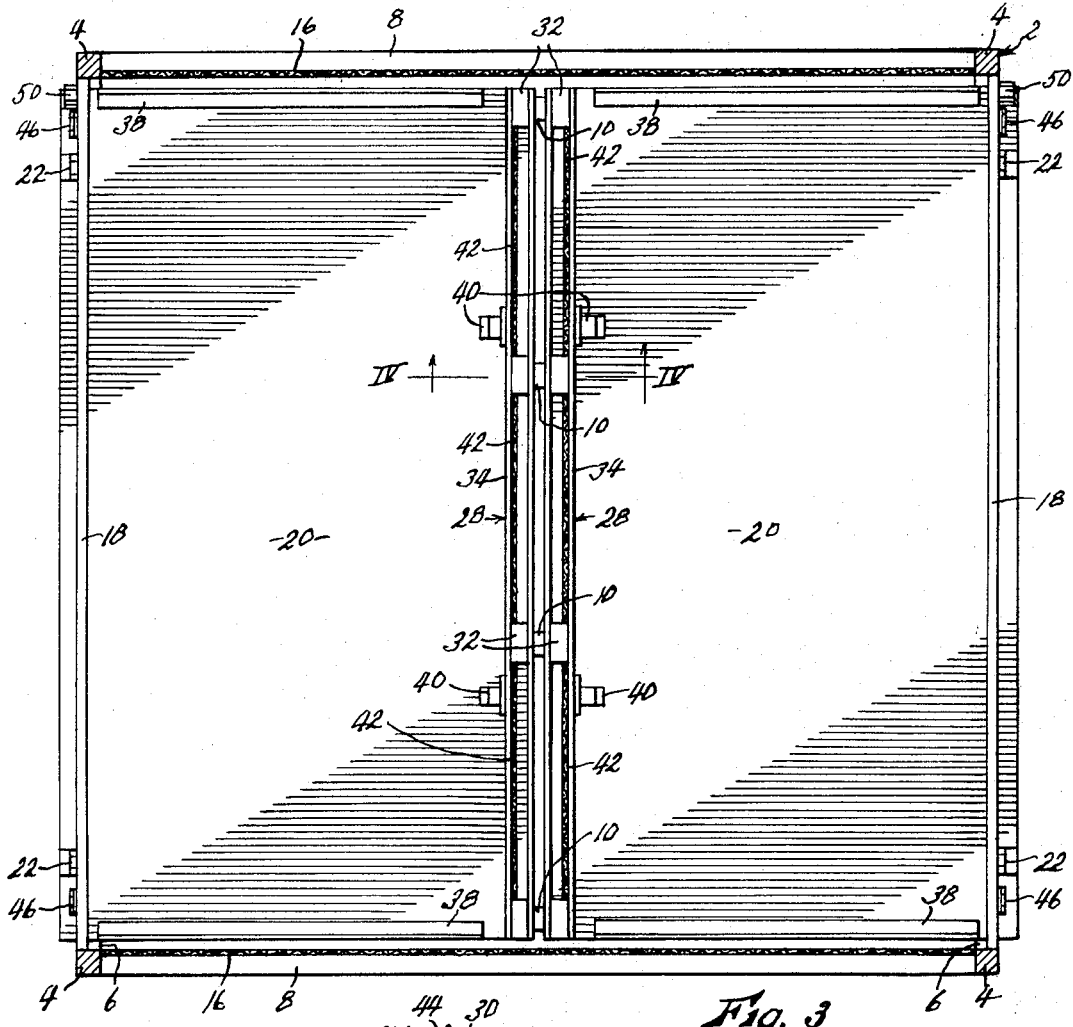
Figure 6:
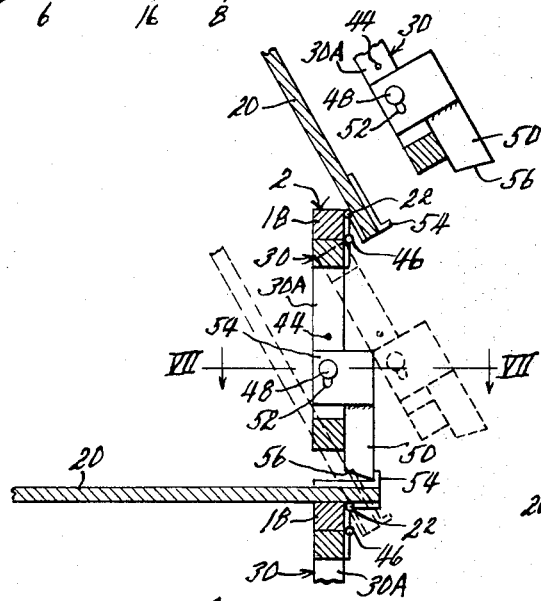
Figure 7:
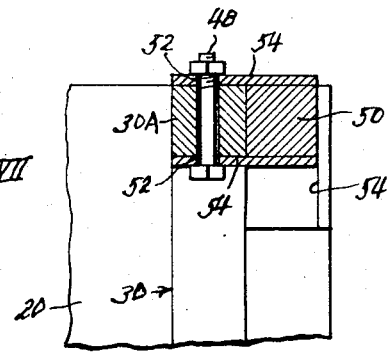

With these objects in view, as well as other objects which will appear in the course of the specification, reference will be had to the accompanying drawing, wherein:

FIG. 1 is a side elevational view of a poultry enclosure embodying the present invention, with all of the trays in their horizontal positions, FIG. 2 is a reduced sectional view taken on line II—II of FIG. 1, with a portion of the trays elevated to their inclined positions, FIG. 3 is a sectional view taken on line III—III of FIG. 2, FIG. 4 is an enlarged, fragmentary sectional view taken on line IV—IV of FIG. 3, FIG. 5 is an enlarged sectional view taken on line V—V of FIG. 2, with all of the trays in their horizontal positions, FIG. 6 is an enlarged, fragmentary sectional view taken on line VI—VI of FIG. 1, showing one of the outer side walls of one of the trays secured closed in solid lines, and released in dotted lines, and FIG. 7 is an enlarged, fragmentary sectional view taken on line VII—VII of FIG. 6.

Like reference numerals apply to similar parts throughout the several views, and the numeral 2 applies generally to the frame of the device. Said frame is open and is generally rectilinear in form, including four vertical corner posts 4 rigidly connected at their lower ends by horizontal longitudinal bars 6 and horizontal cross bars 8. Longitudinal bars 6 may also be connected by intermediate cross bars 10. The corner posts 4 at each end of the frame are connected at their upper ends by a horizontal cross bar 12, and by a second horizontal cross bar 14 spaced below cross bar 12. Each end of the frame is closed by a vertical end wall 16 affixed to the associated corner posts, said end wall preferably being formed of screen wire mesh for purposes of ventilation. At each side of the frame, the corner posts 4 at that side are rigidly connected by a series of horizontal, vertically spaced apart bars 18.

A tray or shelf 20, which is planar, rectangular, and formed of plywood or any other suitable material, is carried by each bar 18 at each side of the frame, except the topmost bar 18, and by the longitudinal bar 6 at each side of the frame. The outer edge of each tray is parallel to the bar on which it is mounted, and is pivoted to said bar by hinge 22 for pivotal movement on the axis parallel to said bar. Each tray may be pivoted from a horizontal position as shown in the lower portion of FIG. 2, upwardly to an inclined position, as shown in the upper portion of FIG. 2. Each tray is of such length that its ends are disposed parallel to and closely adjacent end walls 16 of the frame, and of such width that when horizontal, it extends slightly less than half the width of the frame. Also, each tray extends transversely outwardly from the axis of its hinges 22, so that the projecting portion is lowered when its major portion is raised, for a purpose to be described. When the trays are horizontal, each tray except the lowermost tray serves as a cover for the next lower tray, to assist in confining poultry in said next lower tray. A cover 24 for the topmost tray at each side of the frame, and constituting a planar sheet of plywood or the like, is hinged as at 26 to the topmost frame bar 18 at that side of the frame. Each cover 24 is substantially equal in area to each of trays 20.

To complete the means for confining poultry on the trays, each tray is provided with side and end walls substantially surrounding the entire periphery thereof. The end walls are provided by screens 16 affixed to the frame, each screen serving as an end wall for the adjacent ends of all the trays. However, an angle iron 38 with an upstanding leg is secured along each end edge of each tray, both to prevent the poultry from inserting feet between the edge of the tray and screen 16, and to stiffen the tray. Each tray also has an inner side wall indicated generally at 28, and an outer side wall indicated generally at 30.

Each inner side wall 28 consists of a series of vertical posts 32 spaced along the inner edge of the tray and rigidly joined by longitudinal bars or boards 34 extending parallel to the associated tray edge. Said inner side wall is pivoted at its lower edge to the tray edge by hinges 36, for movement outwardly of said tray on an axis parallel to the tray edge as indicated in FIG. 2. Also, for a purpose to be described, each inner side wall 28 has a pair of downwardly opening hooks 40 affixed to the inner side thereof and adjacent the upper edge thereof. Each side wall 28 constitutes an open frame by reason of its posts 32 and bars 34, but is covered by a screen wire mesh 42 to prevent passage of poultry therethrough, and to provide ventilation. Each side wall 28 has a vertical height equal to the vertical spacing between the trays when the trays are horizontal, and thus serves as a support for the free edge of the next higher tray. The lowermost tray of each series is supported directly by cross bars 10 of the frame.

The outer side wall 30 of each tray also constitutes an open frame formed of bars, for providing free ventilation, but wires 44 may be stretched thereacross to prevent the egress of poultry therethrough. Each of said outer side walls constitutes a door. It is, however, not attached directly to the tray with which it is associated, but instead is pivoted at its upper edge, as by hinges 46, to the frame bar 18 to which the next higher tray is povoted. The lower edge of each door 30 is spaced slightly above the tray with which it is associated. Attached to one of the vertical bars 30A of each door 30, as by a bolt 48, is depending latch finger 50 (see FIGS. 6 and 7), said bolt engaging a vertical slot 52 in the arms 54 of said latch finger which embrace bar 30A of the door, whereby said latch finger can move vertically relative to the door. In the lowermost position of the latch finger, its lower end just clears the upper surface of the associated tray, and is engaged, at its outer side, by an upstanding latch keeper 54 affixed to the tray immediately therebeneath, thus securing the door closed. However, keeper 54 is attached to the portion of the tray disposed transversely outwardly from the axis of tray hinges 22, and is thus lowered when the inner edge of the tray is elevated, thereby being lowered out of engagement with latch finger 50 and permitting the door to pivot outwardly. It pivots slightly outwardly by gravity, due to the placement of hinges 46, but can be pivoted still further outwardly by the weight of poultry against its inner side as said poultry slides or tumbles from the tilted tray. When the tray is again lowered to its horizontal position, the latch does not reengage automatically, but the door can be closed manually, the lower end of the latch finger being bevelled as indicated at 56 to permit it to be cammed upwardly and pass over keeper 54.

At each end of frame 2, a pair of tubular guides 58 are welded or otherwise affixed to cross bars 12 and 14 of the frame. Said guides are generally vertical, respectively at opposite sides of the longitudinal midline of the frame, and each guide carries slidably therein an elongated post 60, at the upper end of which is affixed a horizontal pin 62 which extends inwardly over the topmost trays, longitudinally of the frame. By sliding posts 60 in guides 58, pins 62 may be lowered nearly to the level of the top of the frame, as shown in FIGS. 1 and 5, or elevated well above the frame, as shown in FIG. 2. Each pin may be locked in its lowered or its elevated position by inserting a bolt 64 through matching holes of its associated guide 58 and post 60.

In operation, to load the enclosure with poultry, covers 24 and the topmost trays 20 at each side of the frame are pivoted upwardly to their inclined positions as shown in FIG. 2, and the hooks 40 of said topmost trays are engaged over the associated pins 62, which have previously been raised to their elevated position by the extension of posts 60 in guides 58, and secured by bolts 64. Said posts are normally retracted downwardly to decrease the overall height of the enclosure, especially when the enclosure is mounted on a truck bed, in order to maintain the enclosure within the overall height permitted by highway regulations. The hooks 40 of the topmost trays are disposed closely adjacent the extreme ends of the trays as indicated in FIG. 5, in order to align them with pins 62. The lower trays 20 are then inclined upwardly in sequence, alternately at opposite sides of the frame, in each case engaging the hooks 40 of the tray being elevated over the free inner edge of the next higher tray, which has been previously raised. The formation of the inner side walls 28 of the trays, as shown, leaves the free inner edges of the trays unobstructed for engagement by the hooks. The hooks 40 of all the trays except those uppermost may be spaced inwardly from the ends of the trays, as indicated in FIGS. 3 and 5, for better weight distribution. As each tray is elevated, its outer side wall 30 is unlatched and swings outwardly to some degree, as previously described, so as not to interfere with the upward pivoting of the tray, and its inner side wall 28 also is pivoted outwardly, relative to the tray. These movements of the side walls permit the trays to be moved into much closer relation, normally to their planes, without interference from the said side walls. When all of the trays except the lowermost tray at each side of the frame have been raised and hooked in position as just described, the enclosure is ready for loading with poultry. The trays may be raised manually by a human operator standing within the enclosure, the interior portion of which becomes unobstructed as the trays are raised. Said operator may stand on the uppermost tray not yet inclined, at the side of the frame opposite to that of the next tray to be inclined.

The enclosure may be loaded by any suitable conveyor, not shown, but which may for example, include a conveyor belt discharging poultry at a point above the enclosure, into the upper end of a flexible tubular sleeve or spout, the lower end of which is guided by the operator to distribute the poultry evenly over the area of each tray. When the lowermost trays are filled, the next higher trays are lowered to their horizontal positions, alternately at opposite sides of the frame, and in turn filled with poultry, until all of the trays are loaded. As each tray is lowered, its outer side wall or door 30 must be manually latched in its closed position, as previously described, and its inner side wall 28 serves as a support for the next higher tray when that tray is lowered.

The enclosure may be unloaded by substantially reversing the loading procedure described above. That is, it is unloaded one tray at a time from the top down, at alternately opposite sides of the frame, by inclining each tray in sequence to the positions shown in the upper portion of FIG. 2, and securing it by its hooks 40 in the inclined position. If each tray is about 4 feet by 8 feet in size, as presently contemplated, then the elevation of its inner edge, when it is fully loaded with poultry, may require about 500 pounds of lifting force, and therefore some type of power assist is required. This may be supplied by some type of crane or winch, not shown, disposed above the enclosure and engageable in the hooks 40 of each tray when that tray is to be elevated. As each tray is pivoted upwardly, its outer side wall or door 30 is automatically unlatched, as already described, and swings open to some degree by gravity. When the inclination of the tray is sufficiently great, poultry will slide or tumble therefrom by gravity, being discharged from the outer edge of the tray, its weight pushing door 30 open to a still greater extent if necessary. Actual tests show that poultry will begin to slide on the tray, provided it is reasonably smooth, when its inclination reaches about 30 degrees from horizontal, and that the poultry will lose equilibrum and tumble from the tray when its inclination reaches about 40 degrees, regardless of the smoothness of the tray. As shown, the trays incline to about 60 degrees from horizontal, thus guaranteeing the discharge of the poultry before the tray reaches maximum inclination and approaches the next higher tray.

As the poultry is discharged from the outer edge of each tray, it may be received on a conveyor belt, not shown, running longitudinally of the enclosure at the side thereof. Preferably there are provided two such conveyors, respectively at opposite sides of the enclosure, though not mounted thereon, and said conveyors are vertically movable to be positioned adjacent each tray. However, these conveyors as well as the previously mentioned loading conveyor and power winch fot tilting the loaded trays, are not per se elements of the enclosure as such, and hence are not shown or described in detail.

While the number and size of the trays included are largely matters of choice and design, it will be noted that if each tray is about 4 × 8 feet in size, then the horizontal dimensions of the enclosure, as shown in FIG. 3, will be about 8 × 8 feet, and two or more such enclosures may be mounted in end-to-end relation on the bed of an ordinary flat-bed truck, while, remaining within the usual 8-foot width limitation imposed by highway regulations. Also, if a vertical spacing between trays of 10 inches is maintained, and this spacing has been found adequate for for most poultry, then each side of the enclosure may carry about 12 or 13 trays, and still remain within the total height limitations usually required in highway travel.

While I have shown and described a specific form of my invention, it will be readily apparent that many minor changes of structure and operation could be made without departing from the spirit of the invention.

What I claim as new and desire to protect by Letters Patent is:

1. A poultry enclosure comprising:
   a. a frame,
   b. a generally planar tray pivotally mounted in said frame for movement between a horizontal position and an inclined position, in the latter of which positions poultry on said tray will slide therefrom,
   c. means operable to confine poultry to said tray while said tray is in its horizontal position, and
   d. means operable automatically in response to inclination of said tray to release said confining means, whereby when said tray is inclined said confining means is released and any poultry on said tray will slide therefrom.

2. A poultry enclosure as recited in claim 1 wherein said confining means includes:
   a. an upstanding side wall at the side of said tray which is lowermost when said tray is inclined, said side wall being movably mounted for movement between an operative position obstructing egress of poultry from that side of the tray to an inoperative position not obstructing poultry egress from that side of said tray,
   b. fastening means normally securing said side wall in its operative position, said release means being operable to release said fastening means.

3. A poultry enclosure as recited in claim 2 wherein said side wall is pivotally mounted at its upper edge on an axis parallel to the plane of said tray in all positions of said tray, whereby when said side wall fastening means is released, said side wall will be pivoted outwardly, to permit egress of poultry, by the weight poultry. said pouldty.

4. A poultry enclosure as recited in claim 3 wherein said side wall is pivotally connected at its upper edge to said frame.

5. A poultry enclosure as recited in claim 4 wherein said fastening means includes cooperating latch members carried respectively by said tray and said side wall, said latch members being movable to a disengaged position to release said side wall by movement of said tray relative to said side wall as said tray is moved from its horizontal to its inclined position.

6. A poultry enclosure as recited in claim 5 wherein said fastening means comprises:
   a. a latch finger carried by said side wall and depending therefrom to a point adjacent said tray,
   b. an upstanding latch keeper mounted on said tray and engaging said latch finger to prevent outward pivoting of said side wall but being disengaged from said finger by downward movement thereof, said keeper being transversely offset from the pivotal axis of said tray at the side of said axis opposite from the major portion of said tray, whereby to be lowered out of engagement with said finger, when the major portion of said tray is elevated to its inclined position.

7. A poultry enclosure as recited in claim 6 wherein said latch finger is vertically movable relative to its associated side wall, whereby to be engageable with said latch keeper when the associated tray is in its horizontal position.

8. A poultry enclosure as recited in claim 2 including a series of said trays mounted in said frame in vertically spaced apart relation, whereby each tray except the lowermost tray, serves as a cover for the next lower tray, and hence serves as a portion of the confining means of said next lower tray, and whereby upward inclination of any tray provides access to the next lower tray for depositing poultry therein.

9. A poultry enclosure as recited in claim 8 with the addition of a generally planar cover pivoted to said frame in spaced relation above the uppermost of said series of trays on an axis parallel to the pivotal axis of said uppermost tray, whereby to serve as a cover for said uppermost tray while permitting inclination thereof.

10. A poultry enclosure comprising:
   a. a frame,
   b. a series of generally rectangular trays mounted in said frame in vertically spaced apart relation, each tray being pivoted to said frame on an axis adjacent one edge thereof for movement between a horizontal position and an inclined position, in th latter of which positions poultry on said tray will slide therefrom, c. means operable to confine poultry to said trays while said trays are in their horizontal positions, each of said trays, except the lowermost tray, serving as a cover for the next lower tray to serve as a portion of said confining means for said next lower tray, the confining means for each tray also including an upstanding side wall at the side of said tray which is lowermost when said said tray is inclined, said side wall being movably mounted for movement between an operative position obstructing egress of poultry from that side of the tray to an inoperative position not obstructing poultry egress from that side of the tray, fastening means normally securing said side wall in its operative position, and a second upstanding side wall attached to the free edge of said tray opposite the pivoted edge thereof, and d. means operable to release said fastening means of the movable side wall of each tray, whereby when said tray is inclined and the fastening means of its associated movable side wall is released, any poultry on said tray will slide therefrom.

11. A poultry enclosure as recited in claim 10 wherein said poultry confining means additionally includes a pair of vertical end walls carried fixedly by said frame, said end walls being disposed respectively adjacent the edges of said trays extending normally to the pivotal axes of said trays, whereby to serve as confining end walls for all said trays.

12. A poultry enclosure as recited in claim 10 wherein the said second side wall of each of said trays serves as a support for the free edge portion of the next higher tray in said series of trays.

13. A poultry enclosure as recited in claim 10 wherein said second side wall of each tray is pivoted at its lower edge to said tray for outward movement relative to said tray, on an axis parallel to the pivotal connection of said tray to said frame, whereby said trays may be inclined upwardly, and hence moved into closer relation to each other, without interference by said second side walls.

14. A poultry enclosure as recited in claim 8 with the addition of:
   a. support members carried by said frame and operable to engage and support the uppermost tray of said series of trays when it is moved to its inclined position, and
   b. attachment means carried by each lower tray and operable, when each such tray is moved to its inclined position, to engage and be supported by the previously inclined next higher tray of the series.

15. A poultry enclosure as recited in claim 13 with the addition of:
   a. downwardly opening hook members carried the said second side wall of each of said trays, at the inner surface and adjacent the upper edge of said wall, the hooks of each of said second side walls, except those of the uppermost tray, being operable when the associated tray is inclined, to engage downwardly over the free edge of the previously inclined next higher tray of the series, and
   b. rigid support members carried by said frame and operable to be engaged by the hooks associated with the uppermost tray of said series of trays when said uppermost tray is inclined.

16. A poultry enclosure as recited in claim 10 including two of said vertically spaced apart series of trays mounted in said frame on parallel pivotal axes, the distal edges of the trays of the two series being pivoted to said frame, while their contiguous edges constitute their free edges movable upwardly and outwardly as said trays are inclined.

* * * * *